May 20, 1930.　　H. J. SUTHERLAND ET AL　　1,759,025
MITER CUTTING MACHINE FOR PATTERN BINDING
Filed Jan. 12, 1929　　2 Sheets-Sheet 1
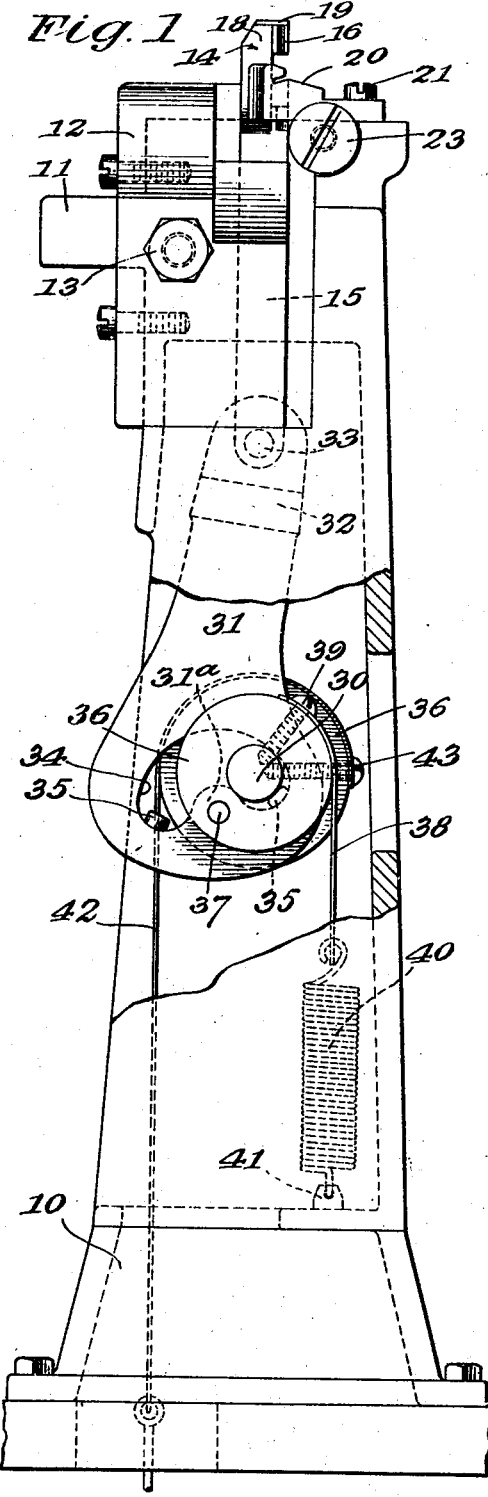
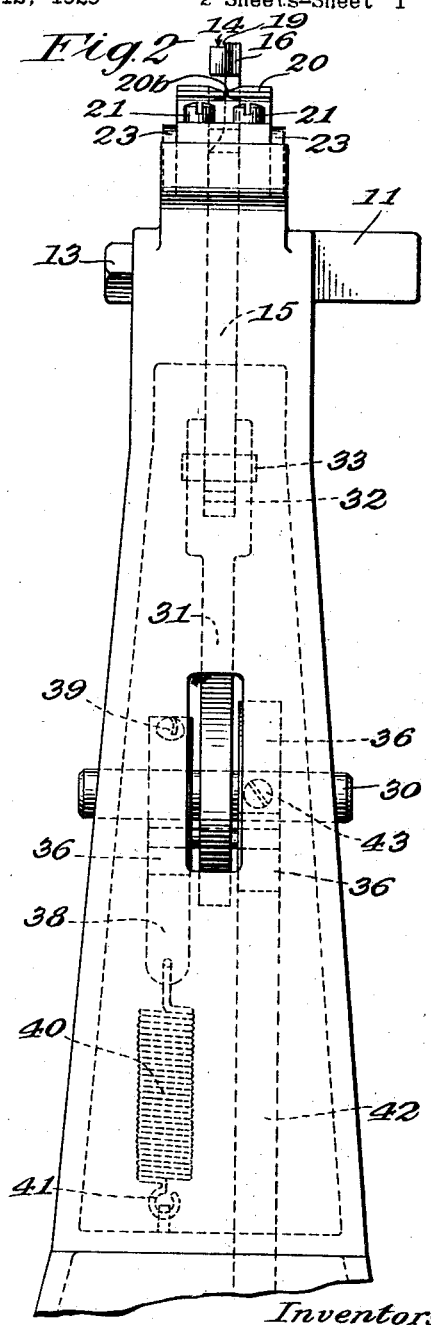
Inventors:
Holton J. Sutherland
John H. Sutherland
Alfred W. Sutherland
By Macleod, Calver, Copeland & Dike
Attorneys

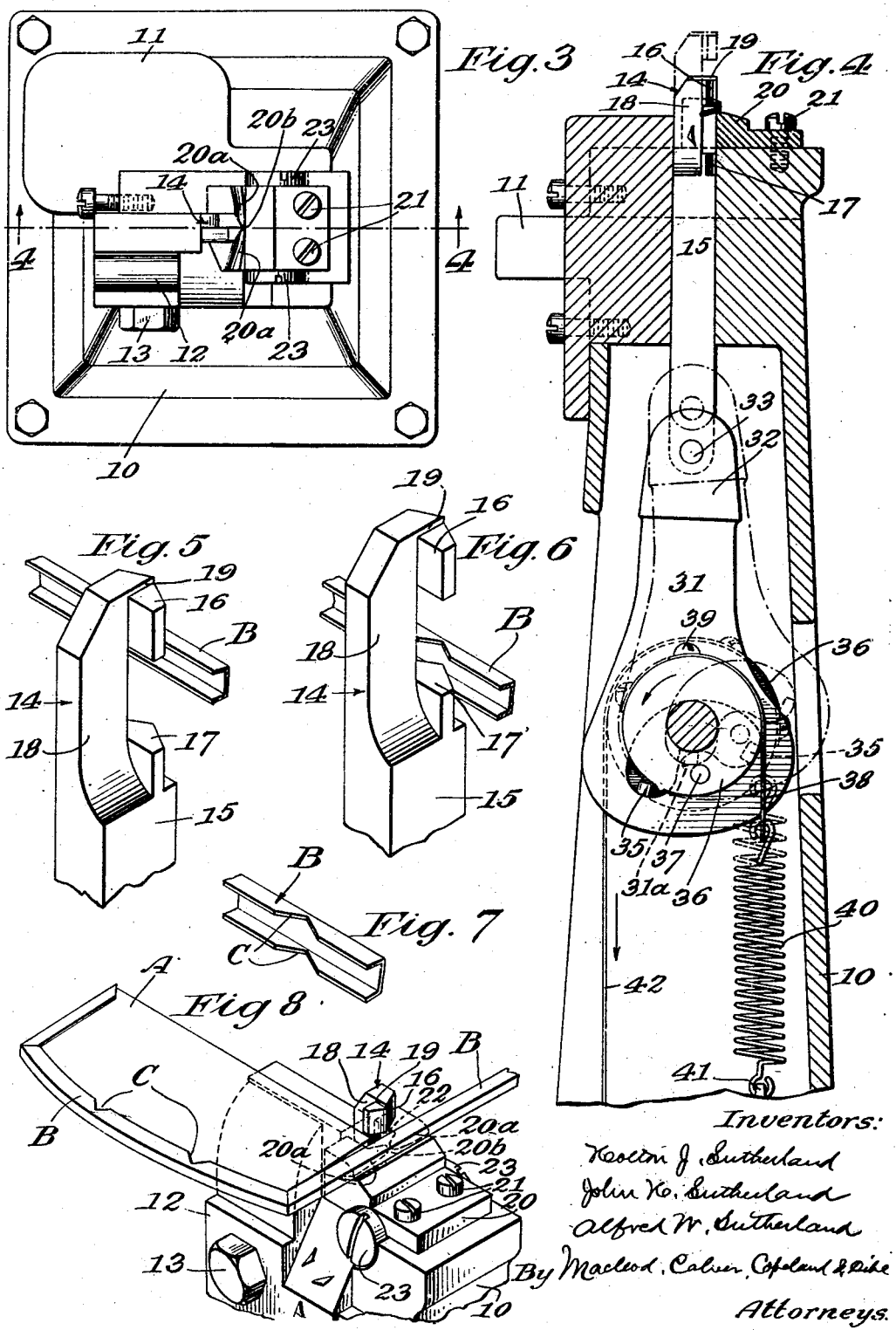

Patented May 20, 1930

1,759,025

UNITED STATES PATENT OFFICE

HOLTON J. SUTHERLAND, JOHN H. SUTHERLAND, AND ALFRED W. SUTHERLAND, OF SWAMPSCOTT, MASSACHUSETTS

MITER-CUTTING MACHINE FOR PATTERN BINDING

Application filed January 12, 1929. Serial No. 332,110.

This invention relates to machines for mitering metallic bindings for patterns and the like, and is an improvement upon the invention shown and described in the patent to Holton J. Sutherland, No. 934,027, issued September 14, 1909.

In the manufacture of boots and shoes and certain kinds of garments, as well as various other articles, it is customary to use a pattern shaped to the blank which is to be cut from a sheet of material out of which the article is to be made and to lay the sheet of material upon a cutting board, placing the pattern upon the sheet and then cutting around the edges of the pattern with a knife to cut the blank of desired size and formation from the sheet. To protect the edges of the pattern, a metallic binding strip of substantially U-shaped cross section is employed. With patterns of various shapes having sharp angles and numerous corners in some instances, it becomes necessary to miter the flanges of the binding strip so that the strip can be bent around the edges of and conform to the outline of the pattern blank. Various machines have been employed for mitering the flanges of binding strips, the common practice being to place the strip in a machine, and cut out the miters in the flanges by cutting through both flanges, with a cutting tool moving in one direction. This operation has produced burrs on the outer faces of the cut flanges, or on at least one of the flanges when both flanges have been cut by a single cutting tool in one stroke. These burrs are extremely objectionable since they produce scratches and roughened surfaces upon fine material, such as highly polished leathers, when the pattern is laid on the material from which the blank is to be cut. The burrs frequently mar the finish of the material, thereby causing great waste or imperfect products.

With the machine of the present invention the foregoing objectionable features of the prior art machines have been completely overcome and it is an object of the present invention to provide a machine capable of producing mitered binding strips, the flanges of which have perfectly smooth outer surfaces.

Another object of the invention is to provide a mitering machine having a punch provided with opposed spaced cutters or cutting portions and to also provide the punch with a guide face with which the work is brought into engagement so as to properly position the binding strip for the mitering operation; it being another object of the invention to provide the shank with an additional guiding portion or tip adapted for particular kinds of work so that the binding strip may be properly positioned with respect to the cutters prior to the mitering operation.

The above and other objects will be apparent from the following description and appended claims when considered in connection with the accompanying drawings.

In said drawings:

Fig. 1 is a side elevation of the machine of our invention with a portion of the standard or casing broken away to show the punch operating mechanism.

Fig. 2 is a front elevation of the machine of Fig. 1.

Fig. 3 is a top plan view of the machine.

Fig. 4 is a section of the machine partly in elevation showing the two cutting positions of the punch.

Fig. 5 is a detail perspective view on an enlarged scale showing the position of the punch with respect to the binding strip when the upper flange is being mitered.

Fig. 6 is a view similar to Fig. 5 showing the operation of mitering the lower flange.

Fig. 7 is a detail perspective of a fragment of a binding strip showing both flanges thereof mitered.

Fig. 8 is a detail perspective view illustrating the operation of mitering the binding strip.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

Referring now to the drawings, in Fig. 8, A represents a pattern having applied to several sides thereof a binding strip B having miters C formed therein. The pattern A with its bending strip is typical of the patterns to which mitered binding strips are applied.

The machine comprises preferably a standard or housing 10 having an offset portion 11 adjacent its upper end. At the upper end of the standard or housing there is a removable plate or section 12 held in position by a bolt 13. The plate is so formed as to provide, when in position, two walls of a longitudinal channel or trackway in which a punch 14 having an elongated shank 15 is positioned. The removable plate permits access to the punch to facilitate its removal or repair when necessary. The punch 14 is provided with a pair of opposed spaced cutting portions 16 and 17, the portion 16 being referred to as the upper cutting portion or member and the portion 17 as the lower cutting portion or member, for convenience. These cutters are spaced apart sufficiently to permit a binding strip B to be brought into position therebetween. The shank of the punch has a reduced portion 18 to provide a guide face against which the pattern blank is positioned to aline the binding strip with the cutters 16 and 17, as shown in Fig. 8. The punch is also provided with an additional guiding surface or tip shown at 19 adapted to serve as a guide for special work; such for example as turning an obtuse angle.

Mounted upon the upper end of the standard 10 is a die member 20 which is held in adjustable position by means of a pair of screws 21. This die member is provided with a cut-out portion 22 (see Fig. 8) forming the outline of the guide channel previously referred to. The die member is also formed with two forwardly projecting curved portions 20$^a$ and a slot 20$^b$ which serve to support a binding strip B. The portions 20$^a$ are so formed as to permit the flanges of the binding strip to project into the guide channel so that they can be mitered upon operation of the cutters, as fully described hereinafter. Additional adjusting screws for the die member are shown at 23 which permit a very fine adjustment of the die member laterally with respect to the cutters 16 and 17.

Any suitable means may be employed for operating the punch so long as the desired reciprocating movement is imparted to the punch member 15. One group of mechanism for accomplishing this purpose is shown in the drawings. Each side of the standard or housing 10 is provided with an external projection or bearing adapted to receive a horizontal rotary shaft 30 which serves as a support for the lower end of a connecting rod or pitman 31 having a forked upper end 32 which receives and has secured therein by means of a pin 33 the lower end of the punch 15. The lower end of the connecting rod is provided with an arcuate slot 34. At each end of the slot there is provided a projection or stud 35. Fixed to the shaft as by means of pins or the like are a pair of spacing rings or disks 36 which serve to maintain the connecting rod 31 in substantial alinement with the guide channel in the upper part of the standard. A horizontal pin 37 extends through the blocks 36 and the interposed connecting rod (Figs. 1 and 4), the pin extending through a hump or raised portion 31$^a$ of the connecting rod. Any suitable means for maintaining the parts in the out-of-use position in which they are shown in Figs. 1 and 2 may be employed. As shown, a metal band 38 is secured by means of a screw 39 to the periphery of one of the rings 36. The lower end of the band is attached to a coil spring 40 connected at 41 to the standard or casing. As shown in Fig. 1 the spring normally maintains the shaft 30 in engagement with the stud 35 at the right hand end of the slot 34. A metal band or the like 42 connected with the other member 36 by means of a screw 43 extends downwardly through the bottom of the standard or housing and is connected with any suitable operating means such as a treadle (not shown).

The operation of the machine is as follows: Referring to Fig. 8 and with the parts in the positions in which they are shown in Figs. 1 and 2, one edge of a pattern blank A having a binding strip B secured to a portion thereof, is brought into engagement with the guide face 18 of the punch. In this position the binding strip B engages over the projections 20$^a$ and the strip is thus held in proper position for the mitering operation. It will be observed that the strip is positioned between the upper and lower cutters 16 and 17 respectively. The treadle is now operated and the members 36 and the lower end of the connecting rod 31 are rotated in a counter-clockwise direction, which movement causes the slot of the connecting rod to ride over the shaft 30 to the position in which it is shown in Fig. 4 immediately above the hump or projecting portion 31$^a$. This causes the punch to move downward to the full line position of Fig. 4 and on this downward movement the upper cutter 16 engages and miters the top flange of the binding strip. This is the extent of the downward movement of the punch. Additional depression of the treadle causes further rotation in a counter-clockwise direction of the members 36 and the lower end of the connecting rod until the parts assume the position in which they are shown in broken lines, Fig. 4, with the shaft engaging the stud 35 at the left-hand end of the slot 34. During this operation the punch moves upward causing the lower cutter 17 to engage and miter the lower flange of the binding strip. Upon releasing pressure on the treadle the spring 40 returns the parts to their normal out-of-use position of Figs. 1 and 2. It is important to note that each of the cutters miters its respective flange from the outside in so that the burr, if any, produced by the mitering operation, is on the inner face of each flange, thereby leaving the outer surfaces or faces of the flanges smooth.

The die member 20 is formed to receive and accurately position the binding strip with respect to the cutters, and as shown in Fig. 8, when one edge of the pattern blank is brought into engagement with the guide face 18, the flanges of its attached binding strip are accurately positioned with respect to the cutting members so that the miters will be made at the proper position to enable the binding strip to be bent around the corner of the pattern. In certain classes of work it may be desirable to employ the guide tip 19 previously referred to for positioning the pattern and binding strip properly for the mitering operation.

Normally, when the binding strip is placed in the machine in position to be mitered its flanges are interposed between the upper and lower cutting portions or members 16 and 17, respectively.

It is important that the mechanism for reciprocating the punch be so designed as to cause first a downward movement of the punch bringing the upper cutter into engagement with the upper flange and mitering the same on the downward stroke, so that a space is provided through which the upper cutter may pass on the reverse or upward stroke, during which stroke the lower cutter is engaging and mitering the lower flange from the outside in.

We claim:

1. A machine for mitering channeled binding strips comprising a reciprocable punch provided with opposed cutting portions, means for supporting a binding strip including a die cooperating with said punch, and means for reciprocating said punch in a manner whereby one of said cutting portions will be moved to miter one of the flanges from the outer to the inner side and the other cutter will be moved to miter the other flange from the outer to the inner side.

2. A machine for mitering channeled binding strips, comprising a standard provided with a guide channel, a punch having opposed cutting portions and a guide face positioned within the channel, means including a die cooperating with said punch for supporting a binding strip with its flanges in position to be mitered, said cutting portions being positioned normally on the outer side of the flanges, and means for operating the punch to miter the flanges from the outer to the inner sides thereof.

3. A machine for mitering channeled binding strips, comprising a standard provided with a guide channel, a punch having spaced cutting portions and a guide face positioned within and adapted to be moved in said guide channel, means including a die cooperating with the punch and cutting portions for supporting a binding strip with its flanges in position to be mitered, said cutting portions being positioned normallly on the outer side of said flanges, and means for causing one of said cutting portions to miter one flange from the outside inwardly when the punch moves in one direction and the other of said cutting portions to miter the other flange from the outside inwardly during the reverse movement of the punch.

4. A machine for mitering channeled binding strips, comprising a standard having a guide channel, a die member forming a part of said channel and providing means for supporting a binding strip with its flanges in position to be mitered, and a punch having opposed cutting portions adapted to be reciprocated in said guide channel, said punch having a guide face located at a predetermined point and a guide tip adapted to cooperate with the work to permit the binding strip to be located in position for the mitering operation.

5. A reciprocating punch for mitering channeled binding strips, comprising a shank having a pair of opposed cutting edges one of which is adapted to miter one of the two flanges of the strip during the movement of the punch in one direction and the other of which is adapted to miter the other flange when the punch moves in the reverse direction, in combination with a die adapted to engage in the channel of the strip, said die being formed with a slot for the passage of the respective cutting edges of the punch.

6. A reciprocating punch for mitering channeled binding strips, comprising a shank having a pair of opposed cutting edges one of which is adapted to miter one of the two flanges of the strip during the movement of the punch in one direction and the other of which is adapted to miter the other flange when the punch moves in the reverse direction, in combination with a die adapted to engage in the channel of the strip, said die being formed with a slot for the passage of the respective cutting edges of the punch, said shank having a tip adapted to serve as a guide to be engaged by a binding strip for positioning the strip with relation to the cutters.

7. A machine for mitering channeled binding strips, comprising a standard having a guide channel, a die member carried by said standard and cooperating with said channel for supporting a binding strip with its flanges in position to be mitered, and a punch positioned within and movable in said channel, said punch having a pair of spaced cutting portions and a reduced portion providing a guide face for the work, said punch also being provided with a guide tip for positioning the flanges of a binding strip to be mitered by the cutters.

In testimony whereof we affix our signatures.

HOLTON J. SUTHERLAND.
JOHN H. SUTHERLAND.
ALFRED W. SUTHERLAND.